Oct. 30, 1956
H. N. YOUNCE, SR
2,768,462
DISENGAGER FOR SNAGGED FISHHOOKS
Filed Sept. 20, 1955
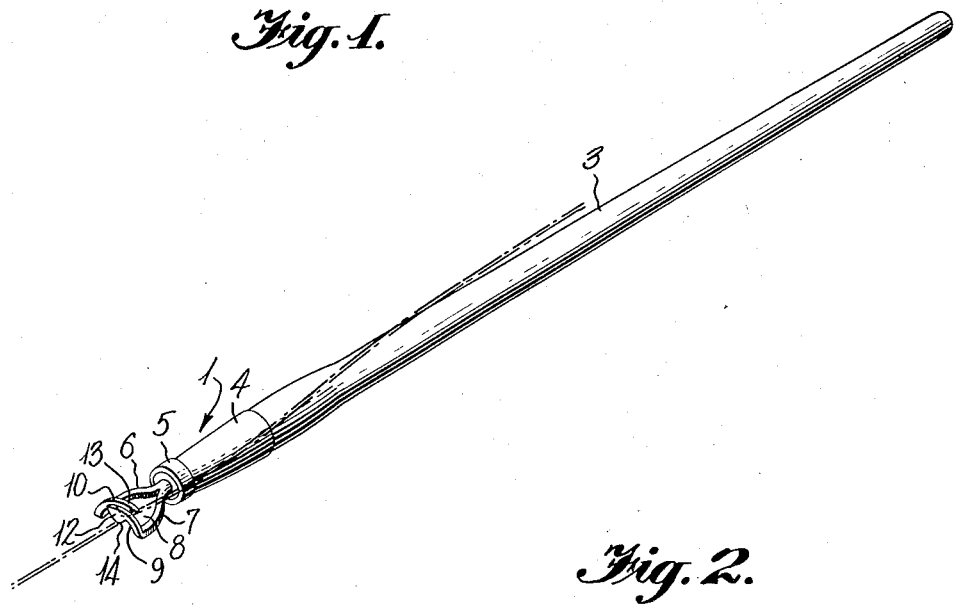
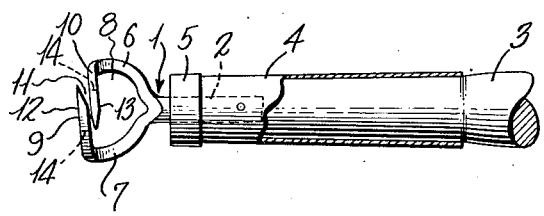
INVENTOR
*Harvey N. Younce, Sr.*
BY
*Mason, Fenwick & Lawrence*
ATTORNEYS

UNITED STATES PATENT OFFICE

2,768,462

DISENGAGER FOR SNAGGED FISHHOOKS

Harvey N. Younce, Sr., Andrews, N. C.

Application September 20, 1955, Serial No. 535,338

3 Claims. (Cl. 43—17.2)

This invention relates to a disengager for dislodging fishhooks, lures, etc., which have become snagged on the bottom, between rocks, or upon other submerged objects.

The object of the invention is to provide a disengager adapted to be secured to the end of a pole, comprising a ring having a portion bent to lie in a plane perpendicular to the axis of the pole, said bent portion having an inwardly extending projection defining shoulders on each side at its base, and split so as to admit the line laterally to the space within said ring, so that the disengager may be lowered along the line guided by the latter until it reaches a point adjacent the snagged hook. By turning the pole axially, the line engages the projection at one or the other of the shoulders and is forcibly deflected angularly with respect to the normal axis of the line. This tilts the hook angularly with respect to whatever is detaining it, and may generally be counted upon to release the hook.

Other objects of the invention will appear as the following description of a practical embodiment thereof proceeds.

In the drawing which accompanies and forms a part of the following specification:

Figure 1 is a perspective view of a snagged hook disengager embodying the principles of the invention;

Figure 2 is a side elevation, partly in section.

Referring now in detail to the drawing, the numeral 1 represents the disengager as a whole, which as shown, comprises the tang 2 inserted in the end of the pole 3 in conventional manner. A tapered socket 4 is shown surrounding the end portion of the pole, having a ferrule 5 with a hole in the middle through which the tang passes. This form of construction is familiar in agricultural hand tools, and may be substituted by any equivalent means for holding the disengager in place. The tang is bifurcated, forming the arms 6 and 7 which lap at their ends, forming what has been termed a bent ring enclosing the space 8. Said ring is bent so that the end portions 9 and 10 lie in planes substantially perpendicular to the axis of the pole. Said end portions lap, leaving a narrow space 11 between them, which is also substantially in the plane perpendicular to the axis of the pole, and provides a slot through which the fish line may be inserted into the space 8. The ring may be considered a split ring with the plane of the split in the bent portion. The lapping portions 9 and 10 are provided with the congruently arranged inwardly extending projections 12 and 13. Said projections have the shape substantially of isosceles triangles, each defining a shoulder 14 with the adjacent portion of the ring. Considered functionally, the lapping projections may be regarded as a single projection with a shoulder 14 at each side.

Customarily, when the hook is snagged upon some obstruction, at the bottom, there is not much that one can do to dislodge it, since it is impossible to impart any material lateral pull on the hook by manipulation of the line from a point remote from the hook. In the use of the disengager of the present invention, it is necessary merely to insert the line within the ring by passing it through the slot in the ring so that it lies within the space 8. The part of the line above the ring may then be laid close against the pole and the latter moved down the taut line, guided thereby, in the direction of the hook. When at length it can be moved no farther, the pole is rotated to bring the line against the composite projection 12, 13 against one of the shoulders 14. This turning movement deflects the line abruptly from its normal axial position with respect to the disengager and imparts corresponding angular deflection to the hook. If it is not dislodged at first instance, the pole is rotated in the opposite direction to bring the opposite side of the projection against the line, deflecting it and the hook in the opposite direction. Ordinarily, one or the other of these movements may be counted upon to free the hook, although in stubborn cases repetitive reversals in the direction of turning of the pole may be required.

Due to the fact that the slot which gives access to the space 8 is in the plane of rotation of the bent part of the ring, and therefore, substantially perpendicular to the line, there is no risk of the line escaping from the disengager while the latter is in operation.

While I have in the above description disclosed what I believe to be a preferred and practical embodiment of the invention, it will be understood by those skilled in the art that the details of construction and arrangement of parts may be varied without departing from the concept of the invention, so long as the principle of having the projections rotate in a plane perpendicular to the axis of the line, is preserved.

What I claim is:

1. Disengager for snagged fishhooks comprising an elongated body member having a tang at one end and having a bifurcated portion at the other end, the bifurcations of said portion being divergent from their points of incidence, being correspondingly angularly deflected at intermediate points in their length in planes substantially perpendicular to the axis of said tang, the portions of said bifurcations lying in said planes being bent toward each other forming a ring, with their free ends lapping defining a slot between them for the admission of a fishing line into said ring, and said free ends being provided with congruent projections extending inwardly of said ring substantially in said planes adapted to engage a taut line passing through said ring in a direction perpendicular to said plane, upon rotation of said disengager, for abruptly deflecting the part of said line between said disengager and said hook.

2. Disengager for snagged fishhooks comprising an elongated body member having a tang at one end and having a bifurcated portion at the other end, the bifurcations of said portion being divergent from their points of incidence, being correspondingly angularly deflected at intermediate points in their length in planes substantially perpendicular to the axis of said tang, the portions of said bifurcations lying in said plane being bent toward each other forming a ring, with their free ends lapping defining a slot between them for the admission of a fishing line into said ring, and at least one of said free ends being provided with a projection extending inwardly of said ring substantially in a plane perpendicular to the axis of said tang adapted to engage a taut line passing through said ring in a direction substantially parallel to said tang, upon rotation of said disengager, for abruptly deflecting the part of said line between said disengager and said hook.

3. Disgorger for snagged fishhooks comprising a body member having means at one end for securing the body to a pole, and having the other end bifurcated, the resulting bifurcations forming a split ring folded intermediately in a direction transverse to the axis of the pole securing means, the part of said ring adjacent said pole securing means lying in the plane of said axis, the part of said ring remote from said pole securing means being substantially perpendicular to said axis, the portions of said bifurcations which constitute the remote part of said ring extending circumferentially having their free end portions lapping, and slightly spaced forming a narrow entrance to said ring.

References Cited in the file of this patent

UNITED STATES PATENTS

| | | |
|---|---|---|
| 892,730 | Immell | July 7, 1908 |
| 2,397,916 | Broy | Apr. 9, 1946 |
| 2,502,793 | Kinney | Apr. 4, 1950 |